United States Patent [19]

McCabe

[11] 4,219,185

[45] Aug. 26, 1980

[54] ROTATING BLADE FIRE DAMPER

[75] Inventor: Francis J. McCabe, Doylestown, Pa.

[73] Assignee: Prefco Products, Inc., Buckingham, Pa.

[21] Appl. No.: 906,655

[22] Filed: May 16, 1978

Related U.S. Application Data

[63] Continuation of Ser. No. 770,831, Feb. 22, 1977, Pat. No. 4,113,230, which is a continuation-in-part of Ser. No. 689,994, May 26, 1976, Pat. No. 4,081,173.

[51] Int. Cl.² .............................. F24F 13/14; F16K 1/22

[52] U.S. Cl. ...................................... 251/308; 98/113; 137/601

[58] Field of Search .................... 49/87, 88, 89, 91, 92; 98/110, 112, 113, 121 A; 137/601; 251/305, 308

[56] References Cited

U.S. PATENT DOCUMENTS

| | | | |
|---|---|---|---|
| 145,871 | 12/1873 | Hitchcock | 49/87 |
| 1,695,768 | 12/1928 | Kelly | 49/88 |
| 2,884,005 | 4/1959 | Honerkamp | 137/601 |
| 3,017,899 | 1/1962 | Goldsmith | 98/110 X |
| 3,423,066 | 1/1969 | Henrion | 251/308 |
| 3,426,507 | 2/1969 | Kossowski | 98/110 X |
| 3,908,529 | 9/1975 | McCabe | 98/121 A X |

*Primary Examiner*—Robert G. Nilson
*Attorney, Agent, or Firm*—Benasutti Associates, Ltd.

[57] ABSTRACT

A fire, smoke and air control damper is disclosed wherein one or more hook-shaped hinge portions formed intermediate between the longitudinal edges of each damper blade engage complementally configured hook-shaped hinge elements formed on opposite sides of the damper frame. A novel notch configuration is made in an inwardly depending flange in the frame on opposite sides, the hinge elements being made from at least a portion of the material notched from the frame. In the closed position, various blade portions engage opposite sides of the inwardly depending flange in the frame to form a seal therebetween, thereby providing a positive pressure resistant seal. The seal is made more complete along the flange in the area of the hinge element because of the novel notch configuration.

Several embodiments of actuating the blades to move them between open and closed positions are disclosed. In one such embodiment, a link passes through an arcuate opening in the wall of the frame to engage a linkage rod. Alternatively, an external drive bracket is attached to the front surface of a blade and extended around the frame to form a rod and handle for actuating the blades.

8 Claims, 12 Drawing Figures

ROTATING BLADE FIRE DAMPER

Cross-Reference to Related Applications

This application is a continuing application of my prior co-pending application, Ser. No. 770,831 now U.S. Pat. No. 4,113,230 entitled, "ROTATING BLADE FIRE DAMPER" which in turn is a continuation-in-part of my prior co-pending application Ser. No. 689,994, filed May 26, 1976 now U.S. Pat. No. 4,081,173 entitled "Rotating Blade Fire Damper" which application is incorporated by reference as if fully set forth herein.

Background of the Invention

The present invention relates generally to the field of air control dampers, and more particularly, to those air control dampers which are intended to regulate the volume of air passed along a duct or plenum, or through an opening, and which damper is further adapted to prevent the passage of smoke or fire therethrough when the damper is in a closed position. For discussions of some of the problems encountered in the fire, smoke and air control damper field, please refer to my previously issued U.S. Pat. Nos. 3,899,156; 3,605,603; 3,381,601; and 3,204,548.

In particular, a suitable fire, smoke and air control damper should be easily operable by manual or automated control devices, to allow the flow of air therethrough at any of a desired number of predetermined settings between the closed and open positions of the blades with respect to the frame. With respect to the fire and smoke control aspect of such a damper, it is also important that a damper be capable of withstanding intense heat and/or air pressures which impinge on either side of the damper for substantial periods of time during a fire. Due to the extreme conditions to which such a damper is subjected, it is necessary to provide extra strong blades and a very substantial frame which, together, form a tight, positive seal to effectively shut off the air duct, opening, or plenum. In fact, due to the deficiencies experienced by some practitioners in this field, folding blade fire dampers such as those illustrated in my previously issued U.S. Pat. Nos. 3,908,529; 3,866,657; 3,866,656; 3,833,989; 3,814,165; 3,727,663; 3,401,734; 3,327,764; and 3,273,632 have been utilized in order to overcome those deficiencies otherwise encountered by some devices utilizing a plurality of rotating blades, each of which blades must form a seal with an adjacent blade as well as the frame, which seal is sometimes prone to leakage in the event that extremely precise alignments and tolerances are not maintained particularly where manual and automated control devices pass through the frame of the damper or wall of the duct, etc. This problem has been accentuated by the fact that a smoke and fire damper must function effectively years after it is installed in a relatively dirty environment.

Prior art rotating blade fire and smoke dampers have therefore incorporated extremely heavy materials which are not subject to easy bending or deformation in the presence of heat. The blades are mounted by distinct hinge or pivot means which are separately installed for the purpose of aligning each of the blades for rotational movement and to ensure the interengagement of each blade with its adjacent blade to form a seal therebetween which does not open in the presence of heat or excessive pressures, such as those which might be encountered during a fire.

Summary of the Invention

The present invention overcomes many of the disadvantages of prior art fire, smoke, and air control dampers by providing a rotating blade fire damper which in the fully closed position provides for a positive double seal between hook-shaped sealing portions of adjacent blades and a more complete seal between the inwardly depending flange of the frame and the portion of the blade which engage the flange in the region of the flange hinge element. Unlike prior art fire dampers, the present invention is readily constructed from relatively light sheet metal materials and incorporates a novel blade configuration wherein a hook-shaped hinge portion is disposed intermediate between the sealing portions. The hook-shaped hinge portion of each blade defines that blade into two sections which are parallel and offset by a distance equal to the thickness of an inwardly depending flange formed on the frame. At least two hook-shaped hinge element are formed on opposite sides of the frame to articulate the frame with respect to the blades to allow rotational displacement of the blade between open and closed positions. The hinge elements are formed from flange material notched from the flange in a novel notch configuration. In the closed position, each of the aforementioned sections of the blade forms a seal along opposite surfaces of said flange. Due to the novel shape of the notch in the flange, a greater area of overlap is created between the blade and flange in the region of the hinge element without causing interference between the flange and the blade.

A linkage means is also provided for articulating the position of two or more of said blades with respect to each other during the rotation thereof. Various embodiments are provided for actuating the blades and moving them between open and closed positions. In one embodiment, a link is provided through an arcuate opening in the wall of the frame and is connected to the linkage means to provide manual or automatic movement of the blades. In another embodiment, an external drive bracket is connected to the front of the blades and curves around the frame to form a rod or handle for actuating movement of the blades. A sliding plate or rotating plate is attached to the actuating link or bracket to maintain a seal around openings which are present in the frame or duct to accommodate the actuating device.

Finally, in order to insure that the blades do not override the full open position, various means are provided for stopping movement of the blades in the full open position.

Accordingly, a primary object of the present invention is the provision of a rotating blade, fire and smoke damper with superior sealing characteristics in the closed position.

Another object of the present invention is the provision of a damper having a novel hinge element formed in the frame of the damper.

An object of the present invention is the provision of a damper having an actuating means passing through the frame or duct to move the blades between the open and closed position.

Another object of the present invention is the provision of a damper having novel seals to seal openings, formed in the duct or frame, the openings having been formed for movement of actuating means associated with said damper.

A further object of the present invention is to provide a damper having various stop means for preventing the blade from overriding the open position.

This and other objects of my invention will become apparent from the following description with reference to the accompanying drawings.

Although specific forms of the invention have been selected for illustration and the following description is drawn in specific terms for the purpose of describing these forms of the invention, this description is not intended to limit the scope of the invention which is defined in the appended claims.

Figure 1:
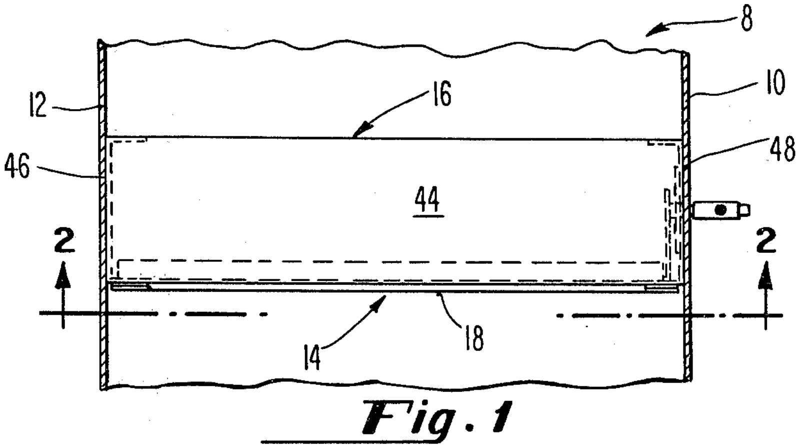
FIG. 1 is a top view of the preferred embodiment damper of the present invention disposed in an air duct.
Figure 2:
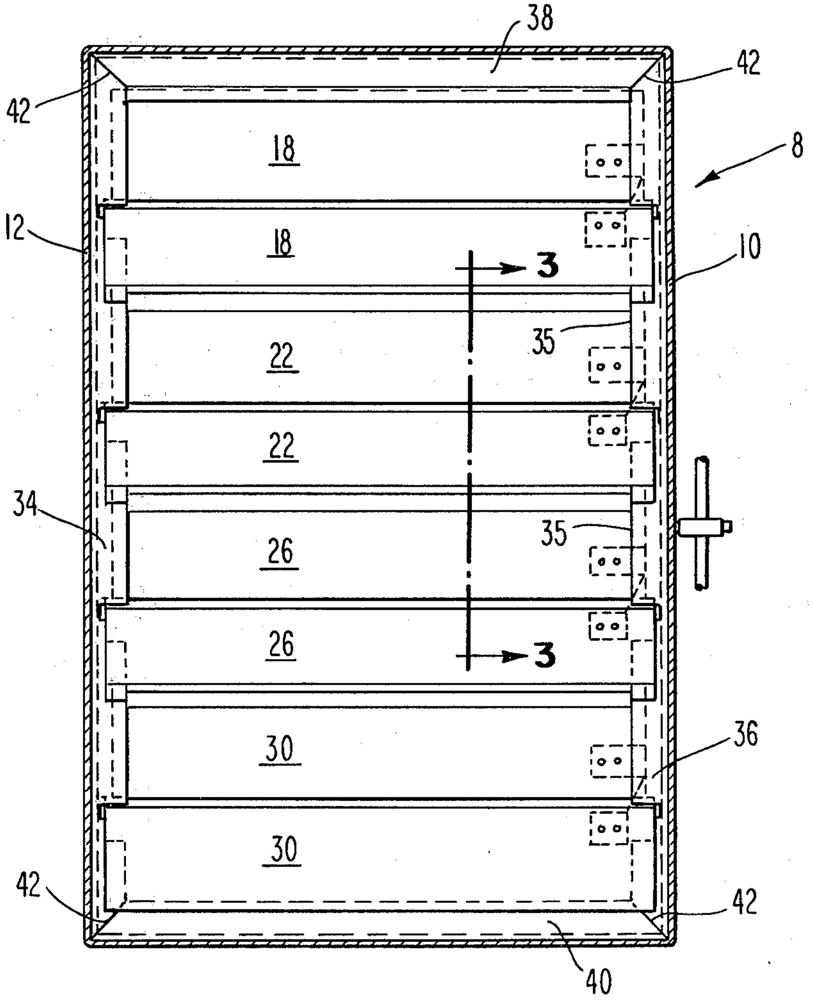
FIG. 2 is a front view of the preferred embodiment damper of the present invention, taken as indicated by the lines and arrows 2—2 in FIG. 1.

Referring now to all the figures, and in particular, to FIGS. 1 and 2, the damper of the present invention in its preferred embodiment is a generally box-shaped damper for disposition in a duct 8 which in FIG. 1 is illustrated by wall sections 10 and 12. The damper, designated generally 14 in the drawings, comprises a frame designated generally 16 and a plurality of blades 18, 22, 26, and 30. The frame designated generally 16 comprises longitudinally extending, inwardly depending flanges 34 and 36 which are disposed on opposite sides of the frame 16 in a plane which is substantially parallel to the plane of the blades 18, 22, 26, and 30 in the closed position. The inward longitudinal edge of flange 36 is 35 in FIGS. 2 and 5. Additional inwardly depending flanges 38 and 40 are also formed in this plane at the top and bottom of the frame. The first of the aforementioned inwardly depending flanges 34 and 36 (the side flanges) are adapted to form a seal with the ends of blades, while the last of the aforementioned inwardly depending flanges 38 and 40 form seals with top and bottom blades 18 and 30 when those blades are in the closed position. In constructing frame 16, the appropriate portions of the inwardly depending flanges 34, 36, 38, and 40 are notched so that when folded into the aforementioned plane, a butt seal is formed at intersections 42 which can be welded for a tighter seal and more rigidity. The frame designated generally 16 further comprises a top 44, a bottom, and sides 46 and 48 which extend generally perpendicularly to inwardly depending flanges 34 and 36 respectively. The construction and assembly of the frame is generally similar to that described in my previously issued U.S. Pat. No. 3,833,989 entitled, "Method of Fabricating and Assembling A Damper".

Figure 3:
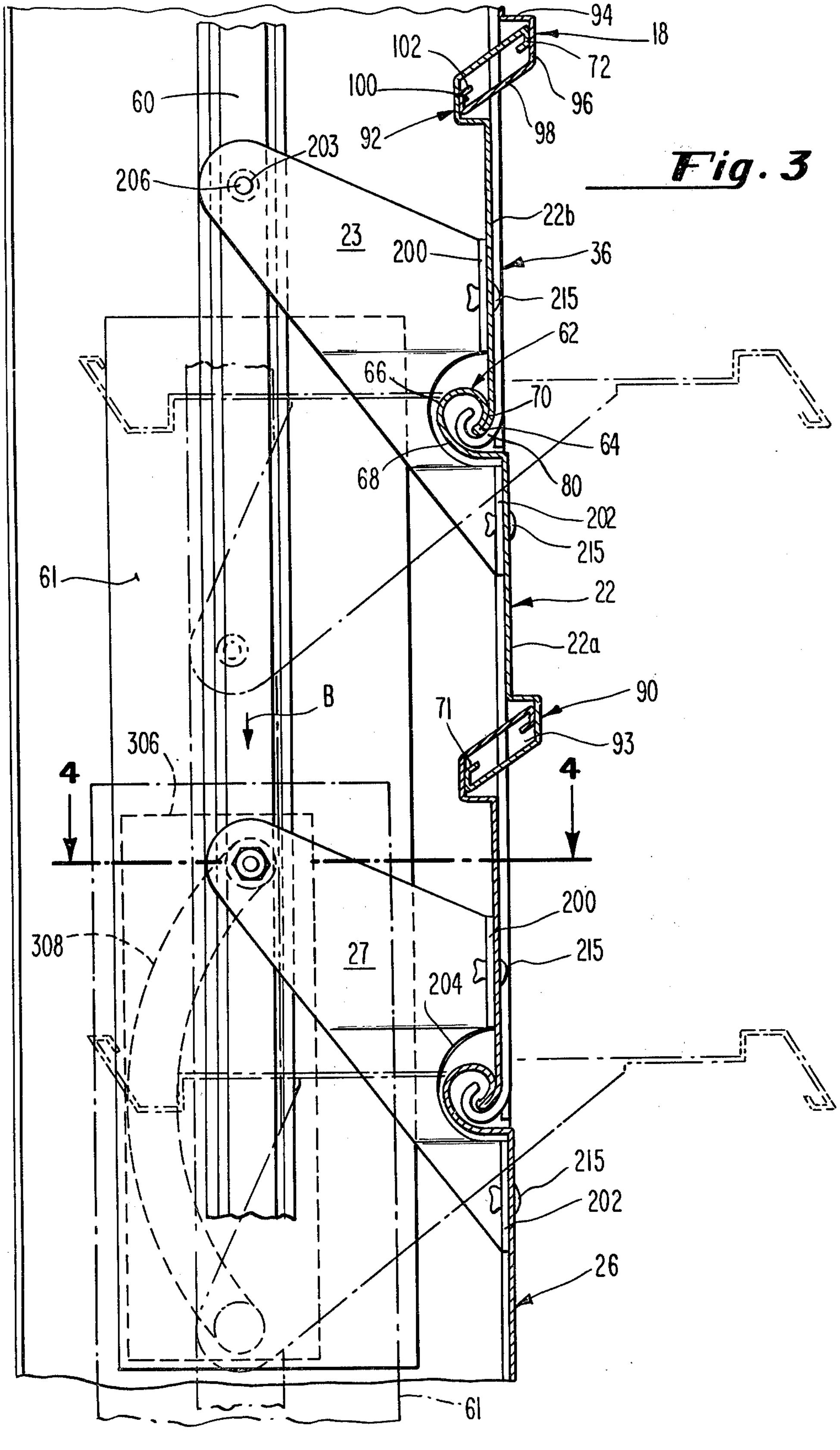
FIG. 3 is a greatly enlarged cross-section of a portion of the preferred embodiment damper of the present invention illustrated in FIG. 2, taken as indicated by the lines and arrows 3—3 in FIG. 2, with the blades in the open position with respect to the frame shown in phantom.

Referring now to FIG. 3, which is a cross-section of a portion of the preferred embodiment shown in FIG. 2, the relative positions of the blades are shown in two different positions. Blade 22 and a portion of blades 18 and 26 are shown disposed in the closed position with respect to inwardly depending flange 36. In a phantom view, blades 22 and 26 are rotated to the open position, which opening is accomplished by movement of linkage rod 60 along the axis as indicated by arrow B in FIG. 3 to the phantom position.

Referring now specifically to the particular blade configuration utilized in the preferred embodiment of the present invention, the blade designated generally 22 has disposed intermediate between the two longitudinal edges thereof a hinge portion designated generally 62. This hinge portion may be roll formed in the blade extending longitudinally across its length. Hinge portion 62 generally comprises hinge tip 64, rounded portion 66, blade offset 68 and overlapping portion 70. My previously issued patent, U.S. Pat. No. 3,908,529, discloses a backdraft damper with a particular blade frame hinging interaction.

As seen in FIG. 3, each blade, such as blade 22, is defined by the hinge portion designated generally 62 into two distinct sections: a first outer blade section *22a* disposed between the hinge portion designated generally 62 and first blade-tip 71; and a second inner blade section *22b* which is disposed generally between the hinge portion designated generally 62 and second blade-tip 72. As clearly illustrated in FIG. 3, the inner blade section *22b* and the outer blade section *22a* are parallel and slightly spaced apart, which spacing is generally established by the configuration of hinge portion 62 and in particular by the length of blade off-set 68. In the preferred embodiment, as shown in FIG. 3, the outer blade section *22a* and inner blade section *22b* are spaced apart by a distance which is substantially equal to the thickness of the inwardly depending flange designated generally 36 in FIG. 3. Inwardly depending flange 36 is formed into a hook-shaped hinge element designated generally 80, which hinge element is formed by notching the appropriate portions of inwardly depending flanges 34 and 36 on opposite sides so that each of the hinge elements such as hook-shaped hinge element 80 are disposed on opposite sides of the frame for engagement in articulated rotational relationship with hinge portion 62 of each respective blade.

Figure 5:
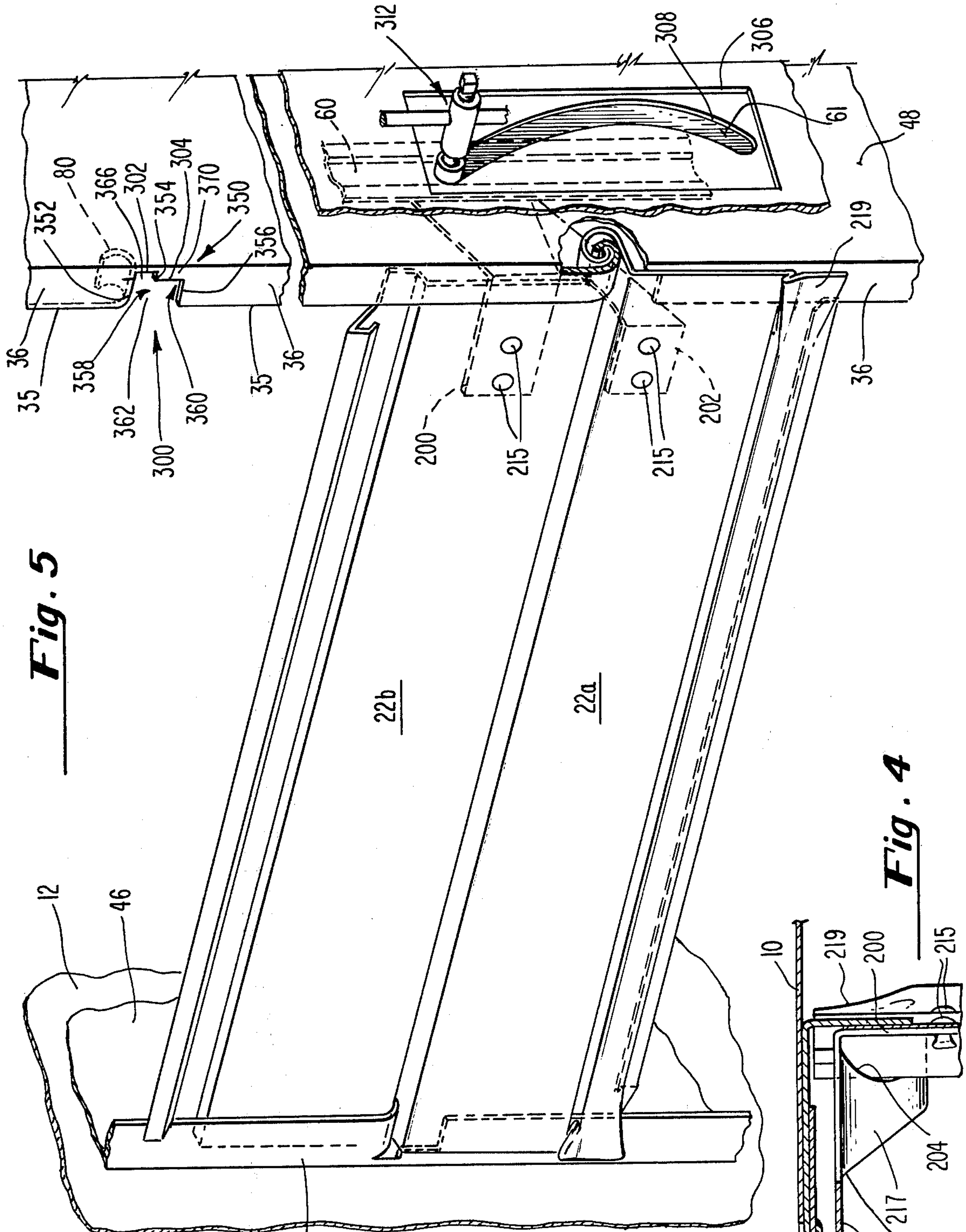
FIG. 5 is an enlarged cross-section of the rod and link connection through the frame and duct walls, taken as indicated by the lines and arrows 4—4 in FIG. 3.

The shape of each of the notches in the inwardly depending flanges 34 and 36 is of particular interest. At least a portion of the material of the notch cut into or stamped from the inwardly depending flange 34 and 36 is shaped to form the hinge element 80 shown in FIG. 3. Referring to FIG. 5, the notch designated generally 300 is defined by the edges of the portion of the inwardly depending flange which is adjacent to the notch 300, this portion of the inwardly depending flange adjacent to the notch designated generally 350. The preferred embodiment notch is comprised by two intersecting and overlapping rectangular portions: a first rectangular transverse portion 358 is bordered and defined by edges 352; 302; the line of edge 354 and the line of flange edge 35; and a second rectangular longitudinal portion 360 is bordered and defined by edges 304; 356; a portion of 352 and the line of flange edge 35. In the preferred embodiment notch, the transverse dimension of the second longitudinal portion which is equal to the length of edge 356 is less than the transverse dimension of the first transverse portion which is equal to the length of edge 352. It may be seen that the area 362 is a common area overlapped by the intersecting portions 358 and 360 of the notch 300, which area 362 is defined by the lines of flange 35, edge 352, edge 354, and edge 304.

The structure of the hinge element 80, shown dotted in FIG. 5, comprises notched flange material removed from the notch 300. The longitudinal portion 360 of notch 300 is selected to extend longitudinally for a sufficient length, and to be of a sufficient width to form the structure of hinge 80, to effectively cooperate with the hinge portion 62 of blade 22. The transverse portion 358 is of sufficient transverse dimension to provide clearance for the hinge portion 62 of blade 22. Hence, a portion 362 of the first transverse portion 358, overlapped by the second longitudinal portion 360, provides a dual function, providing material for a portion of the structure of hinge element 80 and providing clearance for hinge portion 62. The remaining portion 366 of first transverse portion 358 provides additional transverse clearance for hinge portion engagement and provides additional tolerance to ensure that the hinge will not bind. The material formed by this portion of the notch may be utilized to form a portion of the structure of hinge element 80, although it need not be.

By forming a notch 300 with a longitudinal portion of smaller transverse dimension 356 than the transverse dimension 352 of the transverse portion, more flange surface remains adjacent to the notch in the area designated 370. This provides additional flange area for sealing engagement with the blade 22 when the blade is in the closed position, thereby minimizing the leakage through damper. 14 in the portion of the inwardly depending flange 350 adjacent to both the transverse and longitudinal portion of the notch. In the closed position the blade may most preferably engage substantially all of the portion of the inwardly depending flange 350 adjacent to both portions 358 and 360 of the notch 300 however, it is sufficient provided a seal is created between the blade and edge 304.

By so constructing each of the blades in a rotating blade fire damper so that a hinge portion is, as shown in FIG. 3, generally formed intermediate between the tips of the blades, and then by correspondingly off-setting each of two sections of that blade by the width of the associated inwardly depending flanges of the blade, it is possible to form an effective seal along the ends of said blades which are contiguous to said inwardly depending flanges. As shown in FIS. 3 and 5, inner blade section 22*b* is firmly pressed up against the inner surface of inwardly depending flange 36. Following the blade downwards along flange 36, overlapping portion 70 of the hinge portion designated generally 62 is seen to form a seal between it and the interior surface of the base of the hook-shaped hinge element designated generally 80 formed in the flange. Therefore, the inner blade section and the overlapping portion of the hinge portion 62 form a seal with the inner surface of inwardly depending flange 36, while the blade off-set 68 extends outwardly through the first or wider portion 302 of a notch such as notch 300 in FIG. 5 and beyond the outer surface of inwardly depending flange 36 so that the outer blade section 22*a* will when the blade is in the closed position, form a seal between the blade and an outer surface of inwardly depending flange 36 including the notch surrounding portion 350 adjacent the notch portion 358 and 360 and in particular the surface 370 of flange 36 adjacent length 304 which partially borders the second longitudinal portion 360 of notch 300. Finally, referring to FIG. 5, terminal portion 219 of blade section 22*a* is made to clear the outer surface of inwardly depending flange 36 by utilizing a crimping process to crimp terminal portion 219 of outer section 22*a* of the blade.

Another feature of the present invention is the unique sealing arrangement which is effected between adjacent blades along the portions of those blades adjacent to their longitudinal edges. Each longitudinal edge portion of said blade designated generally 90 and 92 for blade 22 in FIG. 3 is formed into a hook-shaped configuration. Each of the hook-shaped configurations formed on these longitudinal edge portion open towards the inwardly depending flange 36. For example, longitudinal edge portion 92 opens toward the inwardly depending flange 36. Similarly, longitudinal edge portion designated generally 90 opens in the opposite direction from longitudinal edge portion 92, but nonetheless towards inwardly depending flange 36 due to the disposition of outer blade section 22*a* on the opposite side of inwardly depending flange 36. Each of the longitudinal end portions of a particular blade are formed into a plurality of portions which portions act to form a chamber or chambers 93 which are "dead air" chambers formed between the longitudinal edge portions of adjacent blades when those blades are in the closed position. Therefore, offsetting portion 94, extension portion 96, transverse portion 98 and tip 100 are formed to coact with the analogous portions of an adjacent blade in the closed portion to form the aforementioned chamber 93. In particular, the function of offsetting portion 94 is to move the interior surface of extension portion 96 away from the plane of the continguous section of the blade so that upon the slight misalignment and/or slight opening of the blades, the leading edge of the blade (i.e. the edge formed at the intersection of the transverse portion 98 and the tip 100) will move in an arc substantially parallel to the surface of the offsetting portion 94 so that a seal will be substantially maintained through an arc of the leading edge having a length of approximately one-half of the length of the offsetting portion. In alternate embodiments, the offsetting portion may be curved or otherwise shaped to more closely approximate the arc of the leading edge to thereby maximize the wiping action thereof. The length of the offsetting portion may similarly be varied depending upon the desired arc of blade rotation while maintaining the double seal between the blades. A serpentine air path will also be formed as the blades open slightly beyond said arc or in the event of leakage between the leading edge of the offsetting portions, which poses maximum resistance to air impinging on either side of the fire damper. As previously mentioned, a double seal is also formed between the tips 100 of adjacent blades and the interior surface of the extension portions 96 of adjacent blades, each of which is parallel to but spaced apart from the plane of their adjacent blade sections when the blades are in the fully closed position. Transverse portions 98 of adjacent blades are substantially parallel to each other when said blades are in the closed position, thereby imparting, together with the aforementioned portions, a cross-sectional configuration to chamber 93 which is a parallelogram having its shorter parallel sides formed by tips 100 and extension portions 96 and longer sides formed by transverse portions 98. Spoilers 102 are additionally disposed on each of the tips 100 which act to increase the turbulence of the air which would tend to pass through the chamber 92 in the aforementioned serpentine fashion as the blades are moved as aforesaid. Thus a double seal will exist as long as the tip 100 of one blade is disposed coplanar with or on the opposite side of the plane defined by the contiguous section of the adjacent blade. A notch may be formed somewhat reducing the longitudinal dimension of a portion of the transverse portion 98, tip portion 100 and spoiler 102 (illustrated for blade section *22b* in FIG. 5) in order to alloy those portions to extend beyond the plane of inwardly depending flange 36, or as illustrated in FIG. 5, upwards from the plane of the paper to effectuate the inner engagement illustrated in FIG. 4. Alternatively, notching may be replaced with a similar crimping process as illustrated for portion 219 in FIG. 5, whereby a double seal will be formed between the overlapping blade outer section *22a* and the inner section of the adjacent blade, which section corresponds to *22b* as illustrated in FIG. 5.

Figure 4:
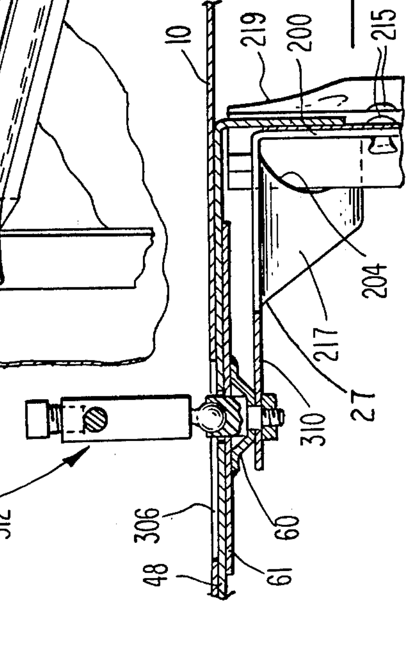
FIG. 4 is a greatly enlarged perspective view of a portion of the preferred embodiment of the present invention showing the preferred embodiment hinge element formed from the notch in the flange of the frame; showing the link connected to the linkage rod through an arcuate opening in the frame wall; showing a portion of the duct wall with a rectangular cut out to accommodate the link rod connection; and showing a portion of the frame cut away to illustrate the hinge detail.

Referring now to the means for articulating the blades with respect to each other and with respect to the frame, blade engaging brackets 23 and 27 are illustrated in FIGS. 3, 4, and 5 and are seen to comprise base portions 200 and 202 which are offset to firmly engage the respective blade sections and are riveted by rivets 215 thereto. Extending generally away in a triangular manner from base portions 200 and 202 towards a fulcrum point 203 at which a pivot 206 is disposed, these blade engaging brackets are connected pivotally with linkage rod 60 so that upon movement of any one of the aforementioned blades or of the linkage rod 60 along the axis as indicated by arrow B in FIG. 3, each of the blades moves to a position such as the position shown in phantom in FIG. 3 which has been referred to herein as "the open position" of the blades with respect to the frame. In this position, the relative proportions of the hook-shaped portions formed on the longitudinal edge portions 90 of each of the blades is seen to be relatively minor with respect to the width of the blades, thereby permitting air to freely pass through the damper when the damper is in the open position. Disposed between base portions 200 and 202 of each of the blade engaging brackets is a curved cut-out 204 which allows clearance for the aforementioned hinge portion designated generally 62 of each of the respective associated blades. Another view of the cut-out 204 is illustrated in FIG. 4 where the blade extending bracket can be seen to have a shape 217 where the bracket crosses over the hinge portion 62 of the blades. This shape 217 allows the lower portion of the bracket 202 to clear the flange 36. With this shape, the blade engaging bracket is pivotally connected to the linkage rod 60 and then is riveted simultaneously to the two sections of blade 22, namely, blade sections *22b* and *22a*. However, in order to do this, the blade engaging bracket must be able to clear the flange 36, and thus the curved portion 217 and the curve 204 result.

FIGS. 4 and 5 also illustrate an external means for actuating the movement of the blades in the damper between the open and closed positions. One embodiment of this actuating means is shown in detail in FIG. 4, passing through a rectangular opening 306 in the outside wall 10 of the duct 8 and through an arcuate opening, denoted 308 in FIG. 5, in the side wall 48 of the damper 14. A preferred embodiment link member, which need not be a link but could alternatively be any member for actuating the blades, is designated generally 312, and is pivotally connected to the planar section 310 of the blade engaging bracket 27. Alternatively, the link member could be connected directly to the blade 22 where no linkage means or rod are present. The blade engaging bracket 27 along the planar portion 310 engages the linkage rod 60, and the linkage rod 60 engages the plate 61. When the actuating means, link member 312, is moved to track within the arcuate path 308 in FIG. 5, the link member 312 will move the plate 61, the linkage rod 60 and the blade engaging bracket in a downward direction such arrow B in FIG. 3. The arcuate cut-out 308 is shown by the dashed line in FIG. 3. The link member can, therefore, move the blades from the closed position, as shown in FIG. 5, to the open position as shown in phantom in FIG. 3 and back again. The plate 61 at all times is in sliding engagement with the interior surfaces of the frame wall, covering substantially all portions of the arcuate opening 308 in the wall 48 of the damper, thereby preventing any leakage through the arcuate opening 308 in the damper wall 48 and the rectangular opening 306 in the wall 10 of the duct during the tracking of the link member within the opening 308. The link member 312 can be any of a variety of suitable mechanisms such as fixed links or monkey links.

It can be seen from FIG. 5 that the arcuate opening provides a natural stop means for preventing the blades from overriding the full open position. As the link is moved to the bottom of the arcuate opening 308, it must come to a stop where the arcuate opening ceases.

Figure 7:
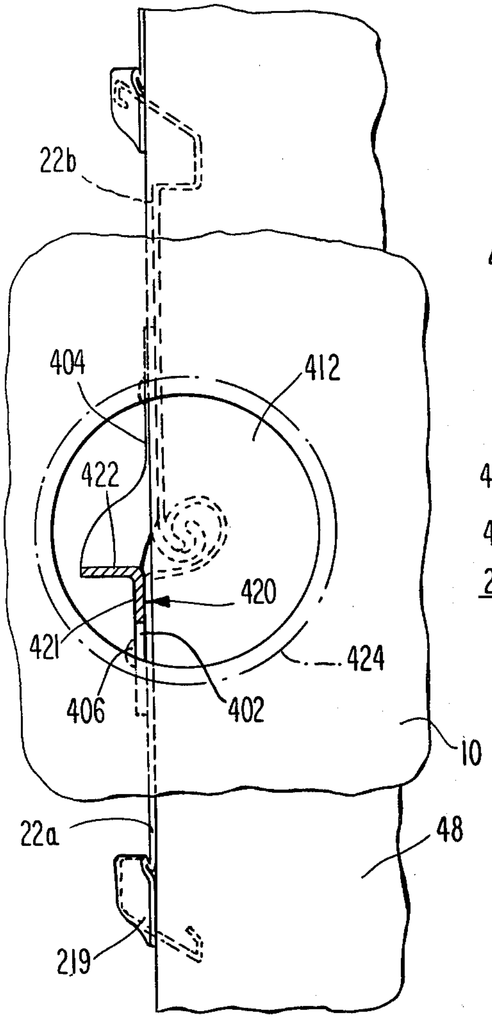
FIG. 7 is an enlarged side view of a portion of the preferred embodiment external bracket actuating means of the present invention, taken as indicated by the lines and arrows 7—7 in FIG. 6 and showing a portion of the duct wall cut away.
Figure 6:
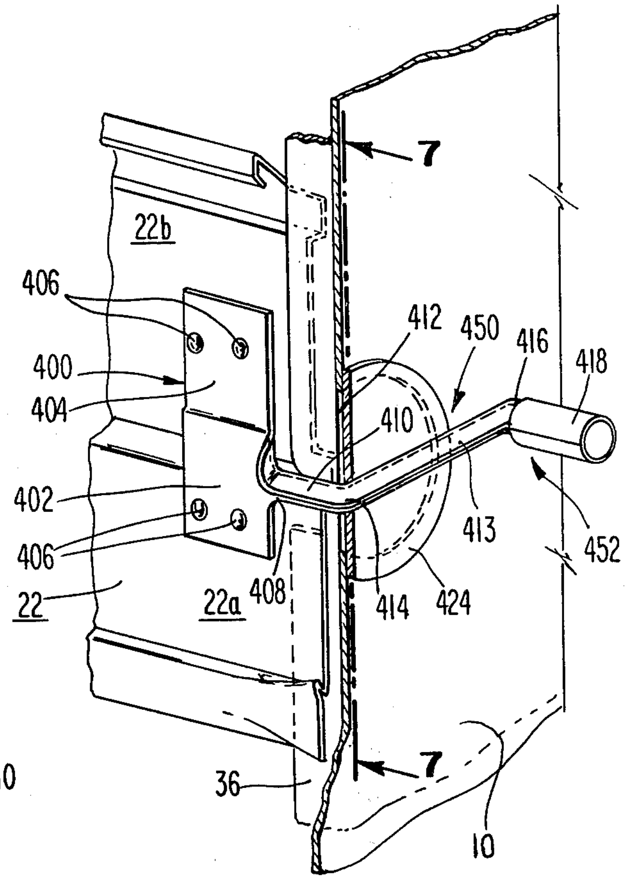
FIG. 6 is an enlarged perspective view of a portion of the preferred embodiment external bracket actuating means.
Figure 8:
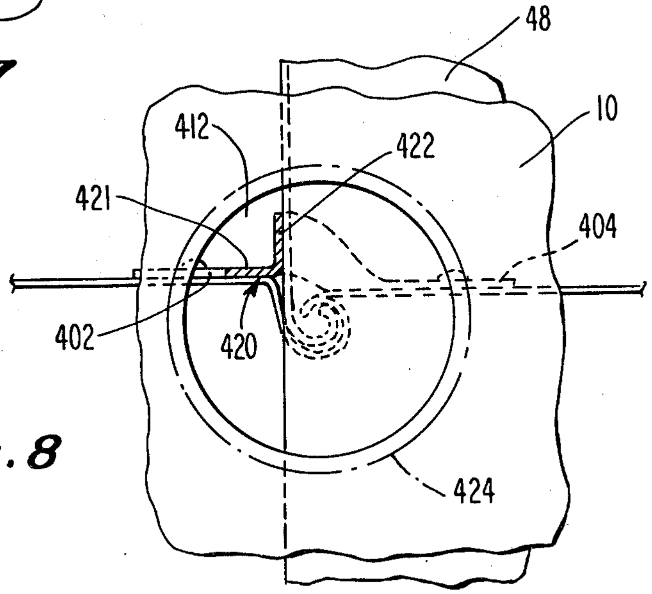
FIG. 8 is a side view of a portion of the preferred embodiment of the present invention showing the external bracket of FIG. 7 rotated 90° and showing the blades in open position.

An alternate means for providing an actuating means to move the blades between the open and closed position is shown in FIGS. 6, 7, and 8. FIG. 6 shows an external bracket means attached to the outside surfaces of the blade 22, the external bracket means being denoted generally 400. In the embodiment shown in FIG. 6, the external bracket means has two planar sections 402 and 404 which engage the sections *22a* and *22b* of the blade 22. The bracket is mounted by suitable attachment means such as rivots 406. In the unique bracket shown in FIG. 6, the bracket extends toward frame wall 48 in an integral extension porton 408 and is drawn and folded to form a rod section or rod portion 410 which extends over and past the flange 36 and frame wall 48 through an opening 412 in the wall of the duct. The rod portion 410 extends parallel to and generally away from the ends of said blades. In the preferred embodiment, the rod portion 410 curves around a first time at 414 away from the flange 36 along the side of the duct 10 in a second rod portion 413. The second rod portion 413 forms a second curved portion 416 to form a final portion which extends away from the wall 10. Handle 418 is shown engaging the final handle portion. The first curved portion 414 and the second rod portion 413, make up a lever portion designated generally 450 which, in the preferred embodiment, extends from the remote end of the rod portion 408 extending in a transverse direction with respect to the axis of the blades. The second curved portion 416 in the final portion, not shown, make up the handle portion designated generally 452, the handle portion extending from the remote end of the lever portion and extending along an axis substantially parallel to the axis of the blades. The extension portion 408, the rod portion 410, the lever portion 450, and the handle portion 452 are integrally formed to make up said drive bracket. When the handle 418 is engaged and rotated in a clockwise direction as viewed looking into the duct through the wall 10 in FIG. 6, the external bracket 400 rotates about the longitudinal blade rotational axis, which passes through the hinge portion 62 along the length of the blade from a hinge element in flange 36 to an opposite hinge element in flange 34. This causes the blades to rotate from the closed position in FIG. 6 and to the open position in FIG. 8.

In the preferred embodiment of the external bracket means, the extension portion 408 of the bracket has a cross-section denoted 420 in FIGS. 7 and 8. This cross-section 420 of the external bracket defines, at a point where the extension portion 408 extends across the flange 36, two legs, 421 and 422. First leg 421 lies substantially in the same plane as bracket portion 402 and blade 22, with second leg 422 joining leg 421 at some angle. In the preferred embodiment this angle is 90°. In FIG. 7, the blades are shown in the closed configuration and the cross-section 420 is as shown with leg 422 at right angles with the plane of the blades. In the full open position of FIG. 9, the blades and cross-secton 420 have rotated around 90° in a clockwise direction as viewed looking into the plane of the paper in FIGS. 7 and 8. The leg 422 of the cross-section 420 has encountered or interfered with the flange 36 to provide a stop means for preventing the blade from rotating any further to bind or ruin the hinge.

In order to allow the external bracket, extension portion, and rod portions to turn when the blades are moved from the closed to the open positions and back again, a circular cut-out, denoted earlier as 412 is formed in the wall of the duct 10. In order to prevent leakage from inside the duct through this opening 412, a circular sliding plate 424, as shown in FIG. 6 and in phantom in FIGS. 7 and 8 is provided attached to the first rod portion 410 of the external bracket means before the first curved portion 414. This circular sliding plates 424 is in sliding engagement with the wall 10 of said duct and rotates with the rod portions and handle portion of external bracket means 400 thereby preventing any leakage to or from the interior of the duct.

Figure 9:
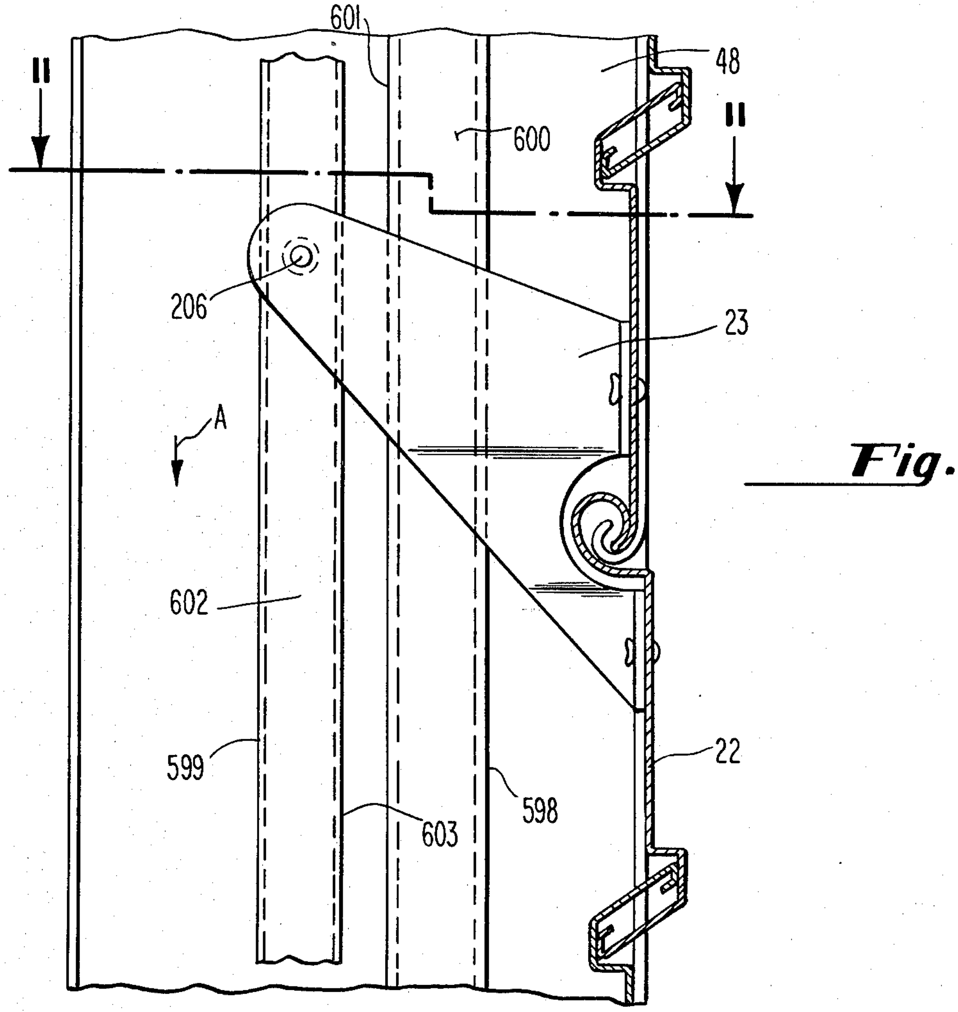
FIG. 9 is an enlarged cross-section of a portion of the preferred embodiment of the present invention illustrated in FIG. 2, showing a preferred embodiment stop member in parallel with the linkage rod.
Figure 10:
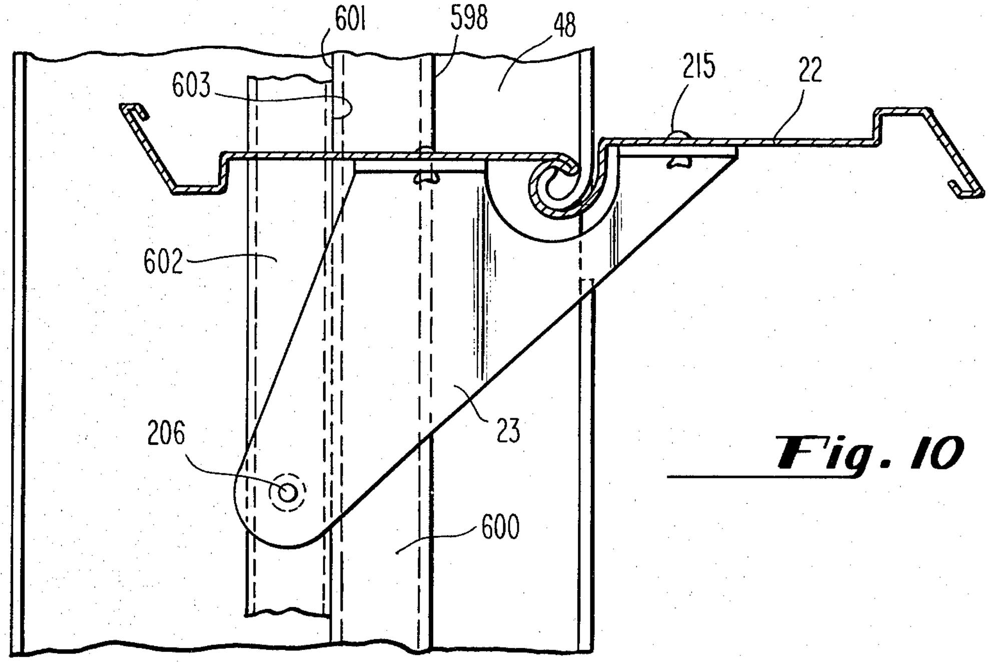
FIG. 10 is a view of the preferred embodiment of the present invention as shown in FIG. 9 with the blade and with the linkage rod engaging the stop member.
Figure 11:
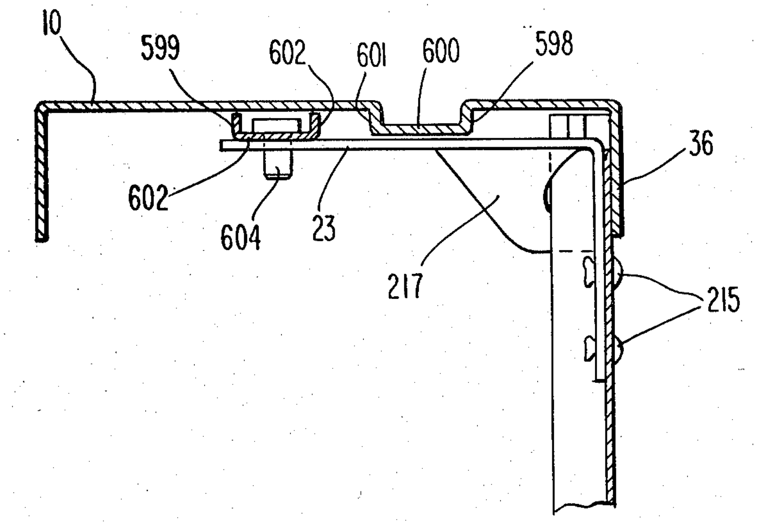
FIG. 11 is a portion of the preferred embodiment of the present invention illustrated in FIG. 9, taken as indicated by the lines and arrows 11—11 of FIG. 9.

Another version of a stop means is presented in FIGS. 9, 10, and 11. The linkage rod 602 with sides 599 and 603 is shown pivotally attached to the blade engaging bracket 23 at the pivot point 206. In FIG. 9, the blades are shown in the closed position, and the linkage rod 602 is shown parallel and spaced apart from a stop member 600 with sides 598 and 601, the stop member being formed in the side wall 48 of the damper frame. When the linkage rod 602 moves in the downward direction, denoted by the arrow A in FIG. 9, it will move the blades to the open position as shown in FIG. 10. Here, the side 603 of the linkage rod 602 engages the side 601 of the stop member 600, thereby preventing further rotation of the blade 22.

FIG. 11 is a view of FIG. 9 taken along the lines and arrows 11—11 in FIG. 9. It shows one embodiment of the stop member as a channel 600 with a U-shaped cross-section formed in the wall 48 of the frame 16 of the damper 14. The U-channel 600 has sides 598 and 601. The linkage rod is shown as a channel 602 with a U-shaped cross-section with sides 599 and 603 in FIG. 11 rivoted by rivot 604 to the blade engaging bracket 23. As the blades move to the open position, the side 603 of the linkage rod 602 moves toward the stop member 600, engaging it along the side 601.

Figure 12:
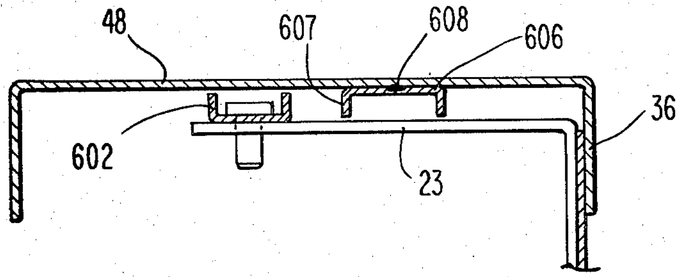
FIG. 12 is an alternate embodiment of the invention shown in FIG. 11.

FIG. 12 is an alternate embodiment of the stop member of FIG. 11. Here the stop member is a channel 606 with a U-shaped cross-section, shown as a separate member from wall 48 which is welded by weld 608 to the wall 48 of the damper frame 16. The U-channel linkage rod 602 of FIG. 11 is shown parallel and spaced apart as in FIG. 11 from the stop member.

As the blades move to the open position, the linkage rod 602 moves toward the stop member 606 and engages it along the side 607.

It will be understood that various changes in the details, materials and arrangement of parts which have been described and illustrated in order to explain the nature of this invention may be made by those skilled in the art within the principle and scope of the invention as expressed in the following claims.

It will be further understood that the "Abstract of the Disclosure" set forth above is intended to provide a non-legal, technical statement of the contents of the disclosure in compliance with the Rules of Practice of the United States Patent and Trademark Office, and is not intended to limit the scope of the invention described and claimed herein.

What is claimed is:

1. In an air control damper comprising a frame having at least one side wall, at least one blade having two interconnected portions disposed about an integral, rotation means for allowing selective rotational displacement of said blade between closed and open positions with respect to said frame, and an actuating means for moving said blade between said closed and open positions, the improvement wherein said wall has an arcuate opening defined therein and said actuating means further comprises a bracket affixed to said blade adjacent said rotation means and a link member attached to said bracket parallel to said blade and extending through said arcuate opening to track within said arcuate opening.

2. In an air control damper comprising a frame, at least one blade having two interconnected portions disposed about an integral rotation means for allowing selective rotational displacement of said blade between closed and open positions with respect to said frame, and actuating means for moving said blade between said closed and open positions, the improvement wherein said actuating means for moving said blade comprises an external drive bracket attached to said blade adjacent said rotation means, said bracket further comprising an extension portion extending toward said frame, and a rod portion disposed over a portion of said frame, wherein at least rotation of said rod portion causes rotation of said blade.

3. The invention of claim 2 wherein said extension portion is formed from the material of said external drive bracket.

4. The invention of claim 2 wherein said external bracket further comprises a lever portion extending from the remote end of said rod portion extending in a transverse direction with respect to the axis of said blade.

5. The invention of claim 4 wherein said external bracket further comprises a handle portion extending from the remote end of said lever portion, said handle portion extending along an axis substantially parallel to the axis of said blade.

6. The invention of claim 5 wherein said extension, rod, lever and handle portions are integrally formed to comprise said drive bracket.

7. The invention of claim 2 wherein at least a portion of said drive bracket is coaxial with the axis of rotational displacement of said blade.

8. In an air control damper comprising a frame disposed in a duct, said duct having a wall with an aperture defined therein, at least one blade having two interconnected portions disposed about an integral, rotation means for allowing selective rotational displacement of said blade between closed and open positions with respect to said frame, and actuating means for moving said blade between said closed and open positions, the improvement wherein said actuating means for moving said blade comprises an external drive bracket attached to said blade, said bracket further comprising an extension portion extending towards said frame, and a rod portion disposed over a portion of said frame and extending away from said blade through said aperture to the exterior of said duct, wherein at least rotation of said rod portion causes rotation of said blade.

* * * * *